United States Patent
Isono et al.

(10) Patent No.: US 7,486,327 B2
(45) Date of Patent: Feb. 3, 2009

(54) IMAGE-TAKING OPTICAL SYSTEM

(75) Inventors: Masashi Isono, Hoi-gun (JP); Takumi Matsui, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 651 days.

(21) Appl. No.: 11/131,863

(22) Filed: May 18, 2005

(65) Prior Publication Data

US 2005/0264671 A1  Dec. 1, 2005

(30) Foreign Application Priority Data

May 25, 2004  (JP) .............................. 2004-154470

(51) Int. Cl.
*H04N 5/225* (2006.01)
(52) U.S. Cl. ..................... 348/335; 348/360; 359/648
(58) Field of Classification Search ................. 348/335, 348/340, 360; 359/362, 364, 645, 648
See application file for complete search history.

(56) References Cited

U.S. PATENT DOCUMENTS 5,541,692 A * 7/1996 Ota .............................. 396/72

6,466,377 B1  10/2002 Saito et al. .................. 359/661

FOREIGN PATENT DOCUMENTS

| JP | 2-191907 A | | 7/1990 |
|---|---|---|---|
| JP | 4-153612 A | | 5/1992 |
| JP | 5-188284 A | | 7/1993 |
| JP | 05188284 A | * | 7/1993 |
| JP | 9-288235 A | | 11/1997 |

* cited by examiner

*Primary Examiner*—Tuan V Ho
(74) *Attorney, Agent, or Firm*—Sidley Austin LLP (57) ABSTRACT

There is provided an image-taking optical system to form an image in a solid-state image pickup element. The image-taking optical system comprises an aperture stop, a positive first lens having a convex surface on an object side, a positive second lens having a convex surface on an image side, and a negative third lens L3 having a concave surface on the image side provided in this order from the object side. In addition, a conditional expression: $0.71 < f1/f2 < 1.1$ (f1: focal length of the first lens, and f2: focal length of the second lens) is satisfied.

13 Claims, 9 Drawing Sheets

SPHERICAL ABERRATION
SINE CONDITION

FIG. 7(A)

ASTIGMATISM

FIG. 7(B)

DISTORTION %

IMAGE-TAKING OPTICAL SYSTEM

The present application claims priority to Japanese Patent Application No. 2004-154470 filed May 25, 2004, the entire content of which is hereby incorporated by reference.

BACKGROUND OF THE INVENTION

1. Field of the Invention

The present invention relates to an image-taking optical system and more particularly, it relates to a high-performance and compact image-taking optical system which is suitable for a digital device (a digital still camera, a digital video camera and the like) which takes an image of an object by a solid-state image pickup element.

2. Description of the Background Art

Recently, as a personal computer or the like is diffused, a digital still camera, a digital video camera and the like (referred to as the "digital camera" simply hereinafter) which can easily retrieve an image information into a digital device has been spread to a personal user. Thus it is expected that the digital camera is increasingly spread as an input device of an image information in the future.

In addition, the solid-state image pickup element such as a CCD (Charge Coupled Device) which is mounted on the digital camera has been miniaturized and accordingly it is required that the digital camera is further miniaturized. Therefore, it is earnestly desired that the image-taking optical system occupying a maximum volume in the digital device is made compact. In order to miniaturize the image-taking optical system, it is the easiest method to reduce a size of the solid-state image pickup element. However, in this case, it is necessary to reduce a size of a light-receiving element, and it becomes difficult to manufacture the solid-state image pickup element and performance required for the image-taking optical system becomes high.

However, when the size of the image-taking optical system is reduced while the size of the solid-state image pickup element is as it is, an exit pupil position consequently comes close to an image surface. When the exit pupil position comes close to the image surface, since off-axis beam emitted from the image-taking optical system is obliquely inputted to the image surface, a light converging performance of a micro lens provided on a front surface of the solid-state image pickup element is not efficiently provided, so that luminance of the image in an image center part is extremely different from that of the image in an image peripheral part. In order to solve the above problem, when the exit pupil position of the image-taking optical system is provided apart from the image surface, the entire image-taking optical system inevitably becomes large.

In addition, because of a recent low-price competition, a low-cost image-taking optical system has been strongly required. In addition, as a density of the solid-state image pickup element becomes high recently, the performance required for the image-taking optical system becomes high. By the above requirements, an image-taking optical system for a solid-state image pickup element comprising three lenses in which an aperture stop is provided in front of the lenses is disclosed in Japanese Unexamined Patent Publication No. 2-191907, Japanese Unexamined Patent Publication No. 4-153612, Japanese Unexamined Patent Publication No. 5-188284, Japanese Unexamined Patent Publication No. 9-288235, or U.S. Pat. No. 6,466,377.

However, according to the three-lens constitution disclosed in the Japanese Unexamined Patent Publication No. 2-191907, the Japanese Unexamined Patent Publication No. 4-153612, the Japanese Unexamined Patent Publication No. 5-188284, or the Japanese Unexamined Patent Publication No. 9-288235, negative power of the second lens is strong. Therefore, manufacturing error sensitivity to a lens axis becomes extremely high, so that it is likely to become difficult to maintain a periphery performance at the time of manufacturing. In addition, according to the three-lens image-taking optical system disclosed in the U.S. Pat. No. 6,466,377, a negative meniscus lens having a convex surface on an object side is provided as the second lens. Therefore, a beam angle inputted to the second lens on the image surface side becomes too steep, which could be totally reflected.

SUMMARY OF THE INVENTION

It is a main object of the present invention to provide a low-cost and compact image-taking optical system.

It is another object of the present invention to provide an image-taking optical system having preferable optical performance as for a solid-state image pickup element.

In order to attain these objects and other objects, according to an aspect of the present invention, an image-taking optical system to form an image in a solid-state image pickup element comprises an aperture stop, and three lenses, that is, a positive first lens having a convex surface on an object side, a positive second lens having a convex surface on an image side, and a negative third lens having a concave surface on the image side provided in this order from the object side, and the following conditional expression (1) is satisfied.

$$0.71 < f1/f2 < 1.1 \tag{1}$$

(f1: focal length of the first lens, and f2: focal length of the second lens)

In addition, according to another aspect of the present invention, an image-taking optical system to form an image in a solid-state image pickup element comprises an aperture stop, and three lenses, that is, a positive first lens having a convex surface on an object side, a positive second lens having a convex surface on an image side, and a negative third lens having a concave surface on the image side provided in this order from the object side, and the following conditional expression (2) is satisfied.

$$-1.16 < f2/f3 < -0.64 \tag{2}$$

(f2: focal length of the second lens, and f3: focal length of the third lens)

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENTS

An embodiment of the present invention will be described with reference to the drawings hereinafter.

Figure 1:
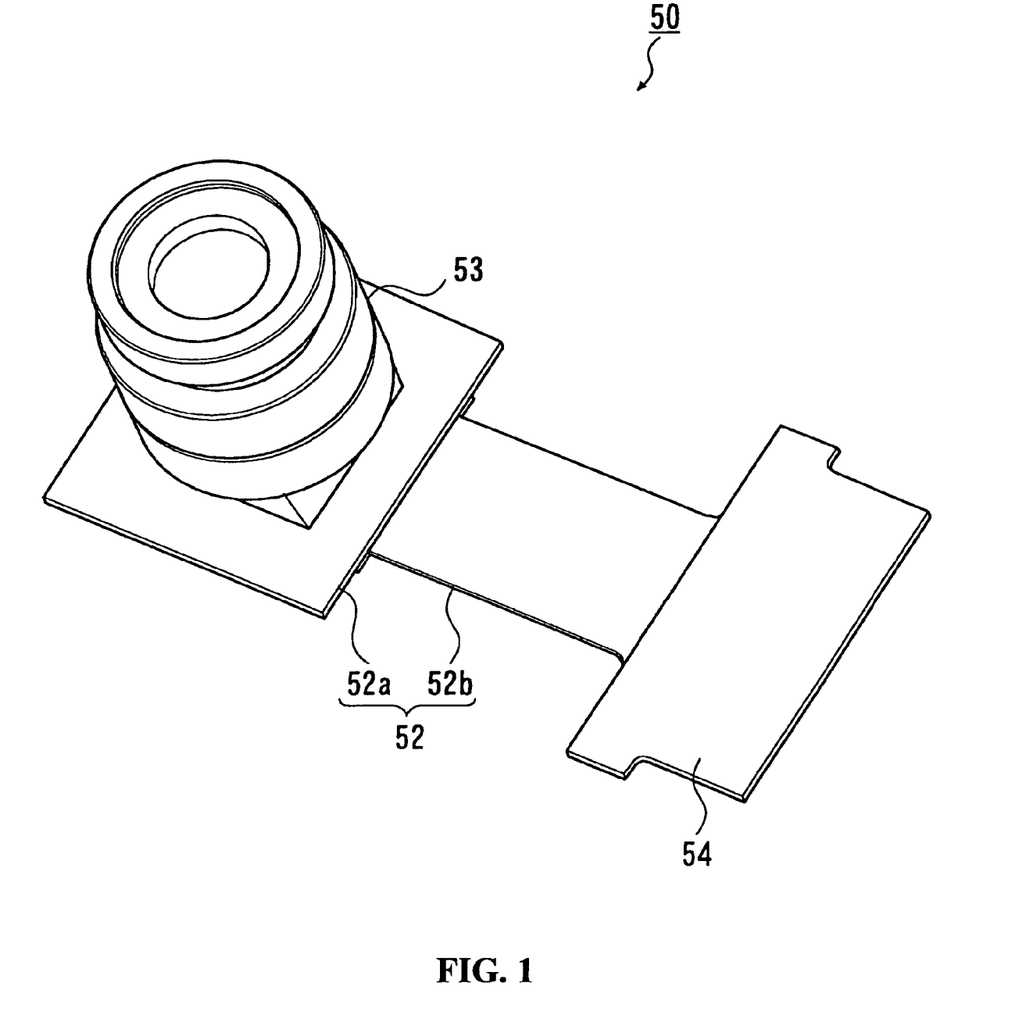
FIG. 1 is a perspective view showing an image-taking device.

FIG. 1 is a perspective view showing an image-taking device 50 according to the present invention. The image-taking device 50 integrally comprises a lens unit 53, a solid-state image pickup element such as a CCD, a CMOS and the like (not shown) as an image pickup device, and a board 52 which holds the lens unit 53 and the solid-state image pickup element and has an external connection terminal 54 which receives and transmits an electrical signal.

The board 52 comprises a support flat plate 52a which supports the solid-state image pickup element and the lens unit 53 on its one flat surface, and a flexible board 52b whose one end is connected to a back surface (which is the opposite side of the solid-state image pickup element) of the support flat plate 52a.

The one end of the flexible board 52b is connected to the support flat plate 52a as described above, and connects the support flat plate 52a to an external circuit (a control circuit in a higher-level device on which the image-taking device is mounted, for example) through the external output terminal 54 provided its other end. In addition, the flexible board 52b can receive a voltage or a clock signal which drives the solid-state image pickup element from the external circuit or output a digital YUV signal to the external circuit. Furthermore, a middle part of the flexible board 52b in a longitudinal direction comprises flexibility and deformability, so that a degree of freedom is provided in the support flat plate 52a to a direction or a position of the external output terminal.

The lens unit 53 is fixed to the flat surface on which the solid-state image pickup element is provided on the support flat plate 52a of the board 52 with the solid-state image pickup element housed inside. Thus, an image-taking optical system is housed in the lens unit 53.

Figure 2A:
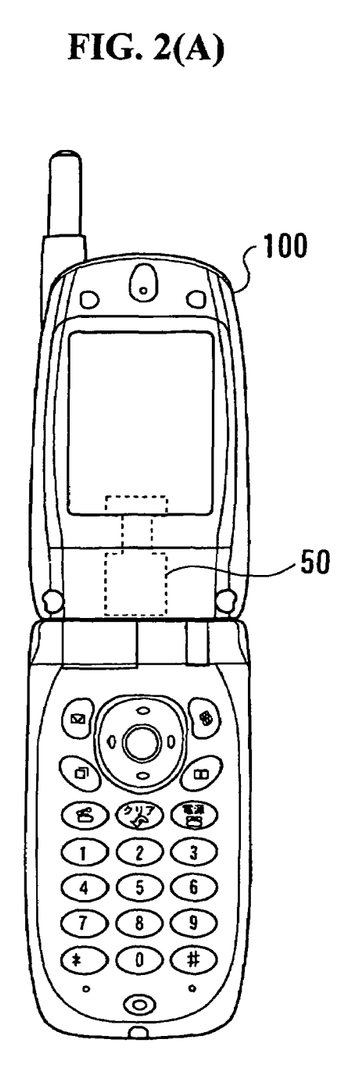
FIG. 2(A) is a front view showing a mobile phone incorporating the image-taking device.
Figure 2B:
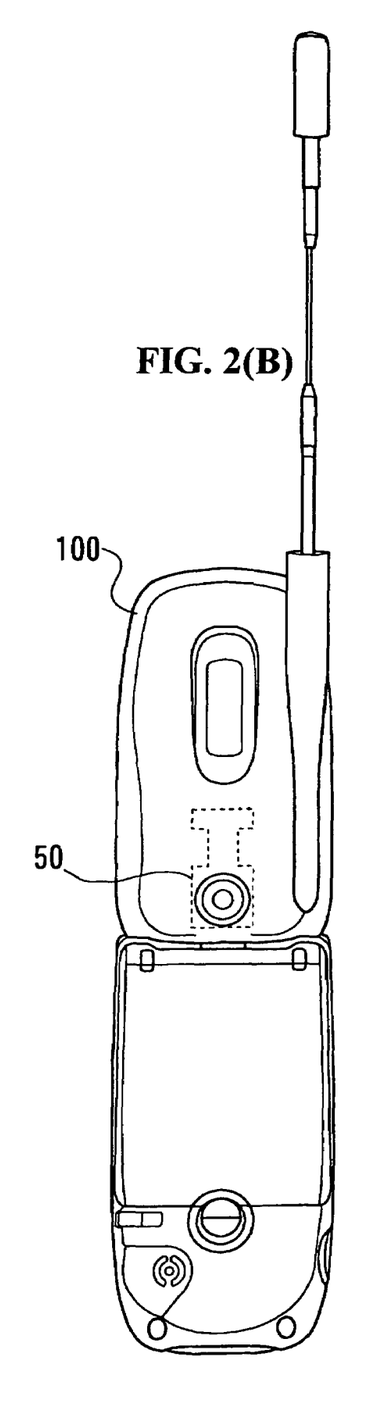
FIG. 2(B) is a back view showing the mobile phone incorporating the image-taking device.

Next, usage of the image-taking device 50 will be described. FIG. 2 shows a state in which the image-taking device 50 is mounted on a mobile phone 100 as a mobile terminal. In addition, FIG. 3 is a control block diagram showing the mobile phone 100.

According to the image-taking device 50, an end surface of the lens unit 53 in the image-taking optical system is provided on a back surface (a liquid crystal display surface is a front surface) of the mobile phone 100 so as to be arranged beneath the liquid crystal display unit, for example.

Thus, the external connection terminal 54 of the image-taking device 50 is connected to a control unit 101 of the mobile phone 100 and outputs an image signal such as a luminance signal or a color-difference signal to the control unit 101.

Figure 3:
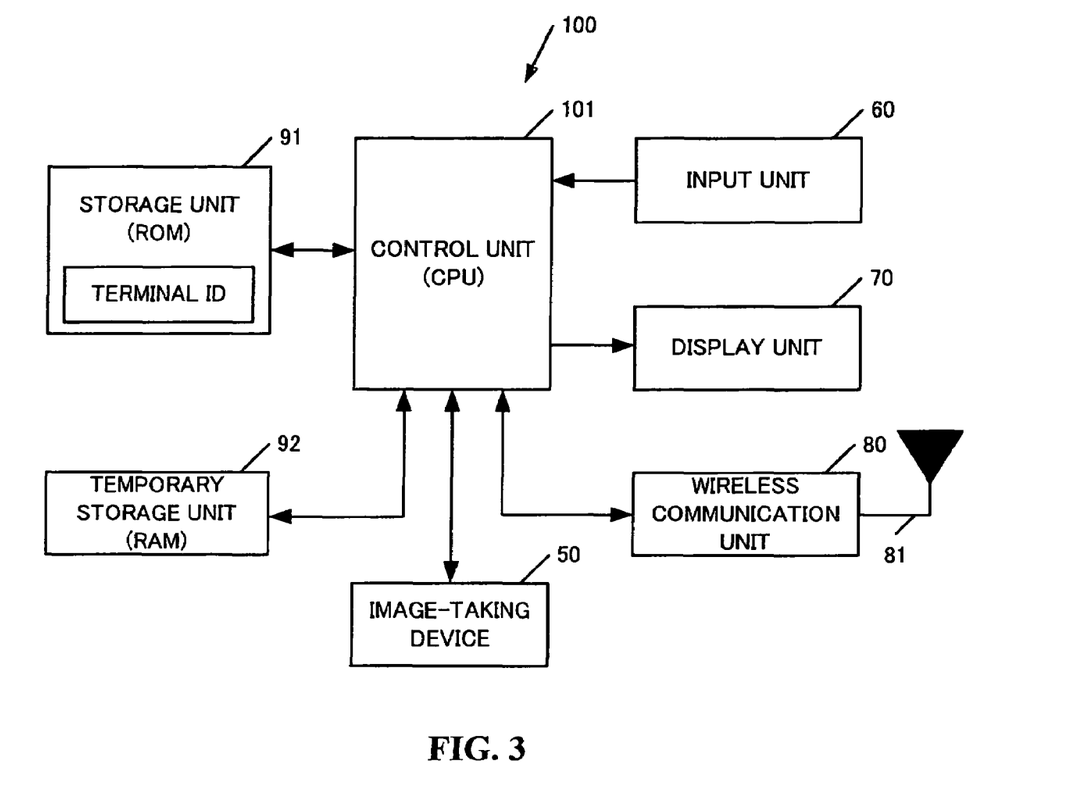
FIG. 3 is a control block diagram showing the mobile phone.

Meanwhile, as shown in FIG. 3, the mobile phone 100 comprises the control unit (CPU) 101 which controls each unit and carries out a program corresponding to each process, an input unit 60 through which numbers and the like are inputted, a display unit 70 displaying an image taken and the like as well as predetermined data, a wireless communication unit 80 implementing various kinds of information communications with an external server, a storage unit (ROM) 91 storing necessary data such as a system program of the mobile phone 100, various kinds of process programs, a terminal ID and the like, and a temporary storage unit (RAM) 92 which temporally stores various kinds of process programs and data carried out by the control unit 101, process data, and image data taken by the image-taking device 50.

The image signal inputted from the image-taking device 50 is stored in the storage unit 92, or displayed in the display unit 70, or transmitted to the external part through the wireless communication unit 80 as image information by a control system of the mobile phone 100.

Figure 4:
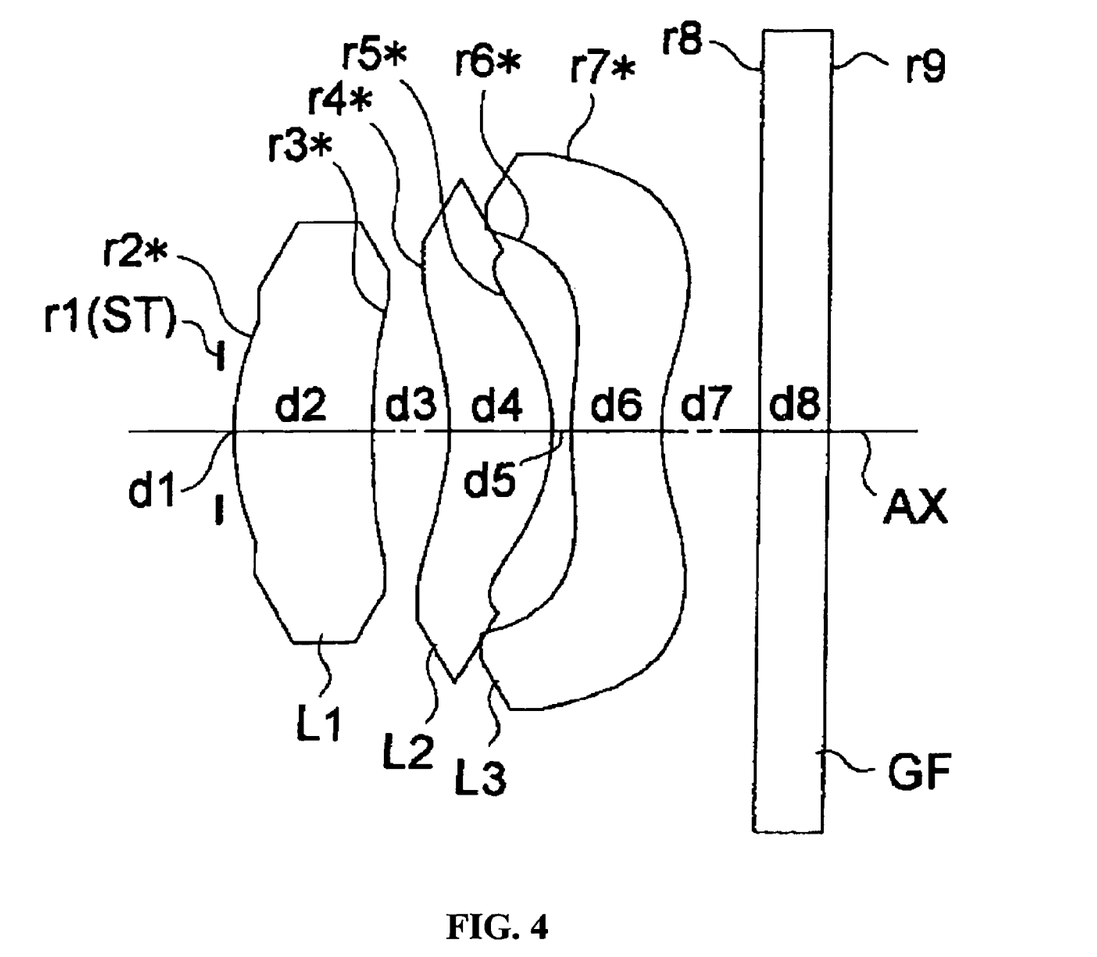
FIG. 4 is a view showing a lens constitution according to an Example 1.
Figure 5:
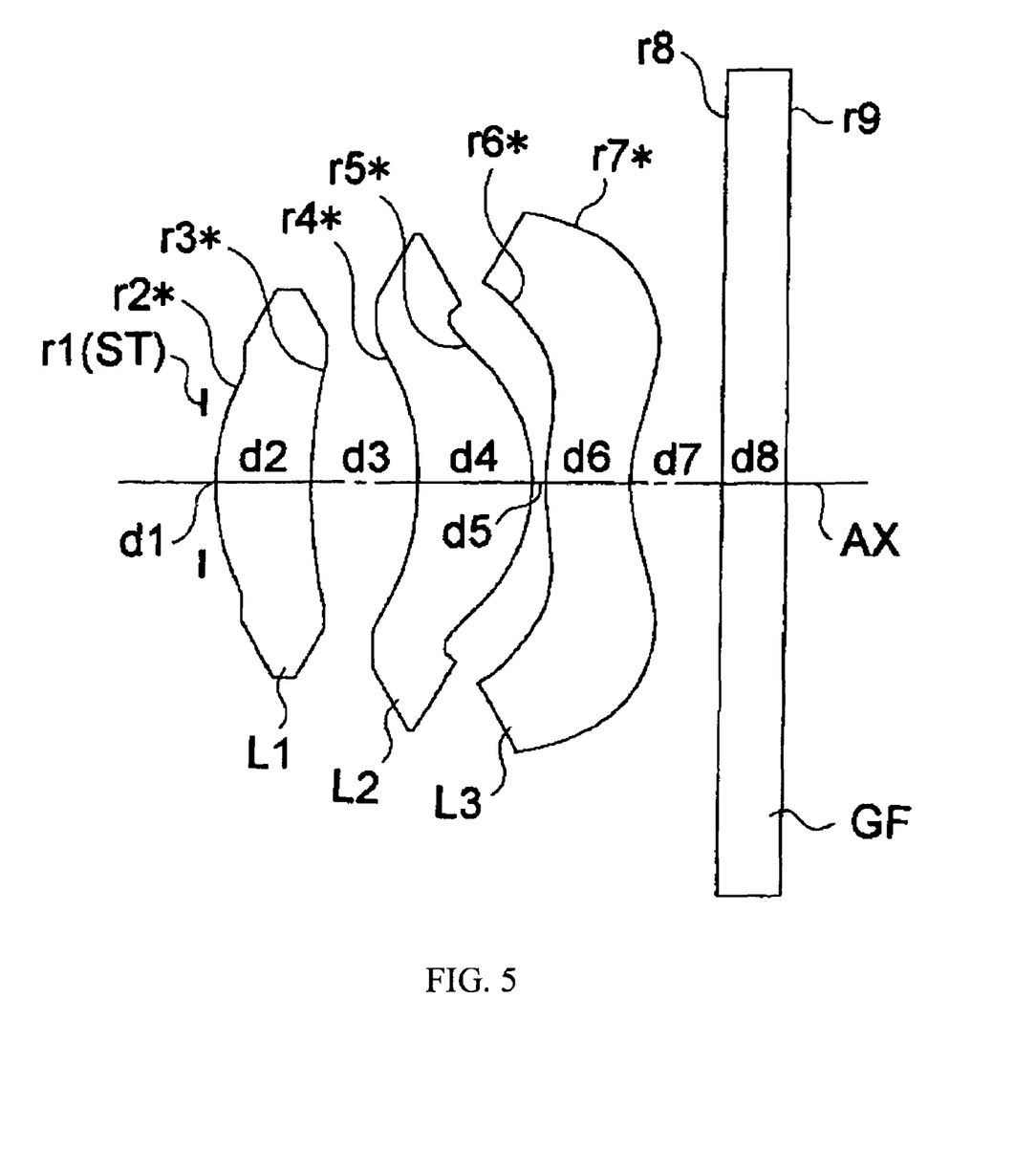
FIG. 5 is a view showing a lens constitution according to an Example 2.
Figure 6:
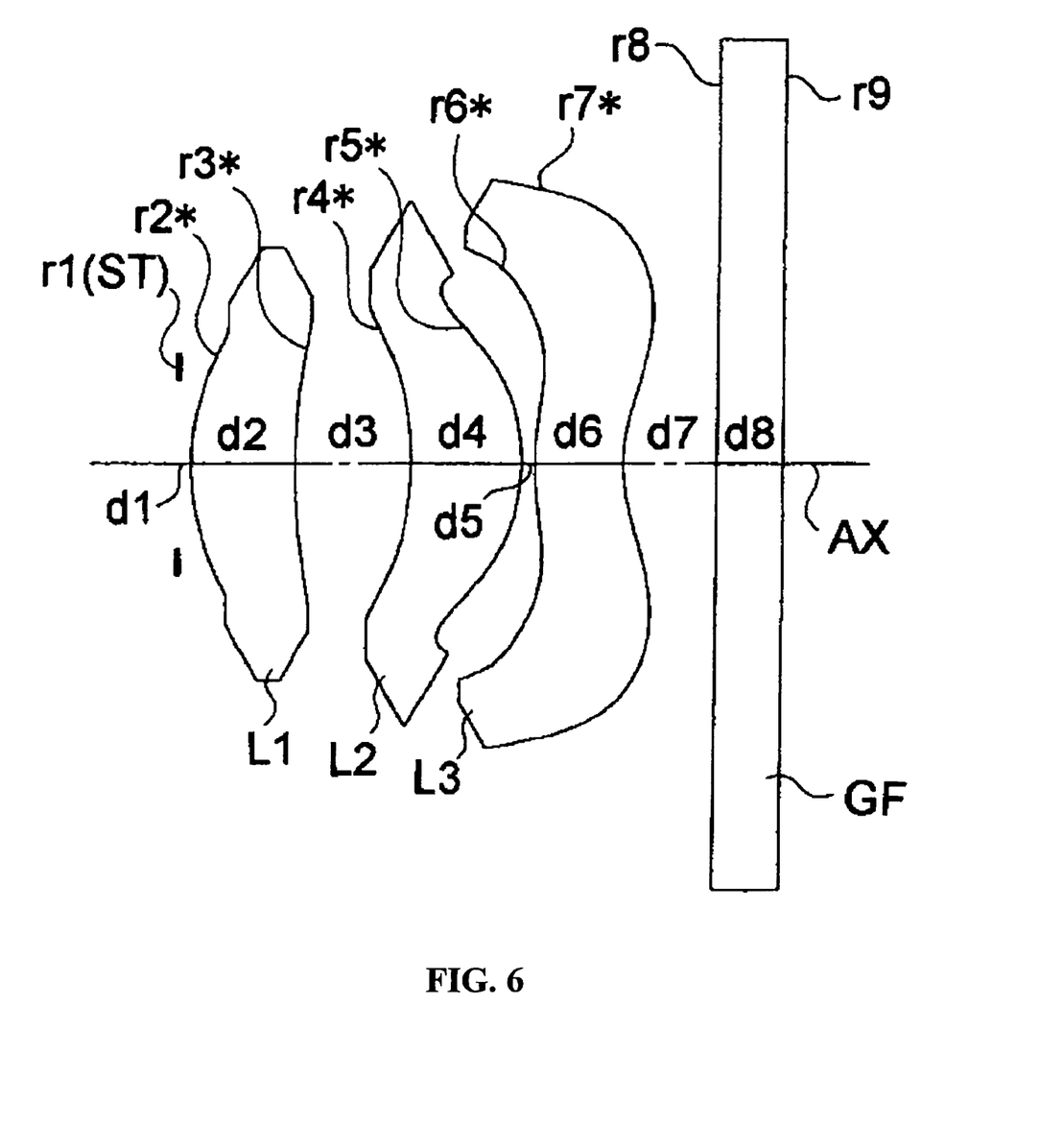
FIG. 6 is a view showing a lens constitution according to an Example 3.

FIGS. 4 to 6 are sectional views showing optical lens constitutions in the image-taking optical system according to embodiments 1 to 3, respectively. The image-taking optical system of each embodiment is a fixed focal length lens for taking an image (for a digital camera, for example) which forms an optical image on the solid-state image pickup element. It comprises an aperture stop ST, a positive first lens L1 having a convex surface on an object side, a positive second lens L2 having a convex surface on an image surface side, and a negative third lens L3 having a concave surface on the image surface side provided in this order from the object side. A glass filter GF having a parallel flat plate configuration which corresponds to an optical low-pass filter and the like is arranged on the image surface side of the lenses. In addition, in each lens constitution diagram (FIGS. 4 to 6), a surface to which ri (i=1, 2, 3, . . . ) is allotted is the i-th surface from the object side (a surface in which * is allotted to ri is an aspheric surface) and an axial distance to which di is allotted (i=1, 2, 3, . . . ) is the i-th axial distance from the object side.

The lens constitution according to each embodiment will be described in detail hereinafter. According to the embodiments 1 to 3 (FIGS. 4 to 6), the first lens L1 is a glass lens and the second lens L2 and the third lens L3 are resin lenses, and the first to the third lenses L1 to L3 are meniscus lenses. That is, the first lens L1 is a positive glass lens having a convex meniscus configuration on the object side, the second lens L2 is a positive resin lens having a convex meniscus configuration on the image surface side, and the third lens L3 is a negative resin lens having a concave meniscus configuration on the image surface side. Each lens surface of the three lenses comprises an aspheric surface.

In each embodiment, a compact size and low cost are implemented while a preferable optical performance as an image-taking optical system for the solid-state image pickup element is implemented by setting an appropriate power (the amount defined by an inverse number of a focal length) in the three positive, positive and negative lenses, for example. Thus, when the image-taking system according to each embodiment is used in an image input device such as a digital camera, a camera phone and the like, high performance, high functioning, low cost and a compact size can be implemented in the image input device. Conditions to provide the above effects in a balanced manner and attain higher optical performance and the like will be described hereinafter.

First, a conditional expression to be satisfied by the image-taking optical system in each embodiment, that is, a conditional expression which is preferably satisfied in the image-taking optical system in each embodiment will be described. However, it is not necessary to satisfy all of the conditional expressions which will be described hereinafter at the same time, and if one is satisfied depending on an optical constitution, its corresponding function and effect can be attained. Of course, it is desirable that the plurality of conditional expressions are satisfied in view of the optical performance, the miniaturization, and manufacturing and assembly operations.

It is preferable that the following conditional expression (1) is satisfied.

$$0.71 < f1/f2 < 1.1 \tag{1}$$

(f1: focal length of the first lens, and f2: focal length of the second lens)

The conditional expression (1) defines a preferable conditional range to balance a total length and aberration mainly regarding the first and the second lenses. When the upper limit of the conditional expression (1) is exceeded, it is advantageous to aberration correction but the total length is increased. On the contrary, when the lower limit of the conditional expression (1) is exceeded, it is advantageous to reduction of the total length but deterioration in the aberration, especially deterioration in distortion and field curvature becomes serious.

It is further preferable that the following conditional expression (1a) is satisfied.

$$0.78 < f1/f2 < 1.01 \tag{1a}$$

The conditional expression (1a) defines a further preferable conditional range in the conditional range defined by the above conditional expression (1) based on the above viewpoint.

It is preferable that the following conditional expression (2) is satisfied.

$$-1.16 < f2/f3 < -0.64 \tag{2}$$

(f2: focal length of the second lens, and f3: focal length of the third lens)

The conditional expression (2) defines a preferable conditional range to balance a total length and aberration mainly regarding the second and the third lenses. When the upper limit of the conditional expression (2) is exceeded, it is advantageous to aberration correction but the total length is increased. On the contrary, when the lower limit of the conditional expression (2) is exceeded, it is advantageous to reduction of the total length but deterioration in the aberration, especially deterioration in distortion and field curvature becomes serious.

It is further preferable that the following conditional expression (2a) is satisfied.

$$-1.06 < f2/f3 < -0.7 \tag{2a}$$

The conditional expression (2a) defines a further preferable conditional range in the conditional range defined by the above conditional expression (2) based on the above viewpoint.

It is preferable that the first lens comprises the glass lens and the following conditional expression (3) is satisfied. In addition, it is further preferable that the first lens comprises the glass lens, the other lenses (that is, the second and third lenses) comprises the resin lenses and the following conditional expression (3) is satisfied.

$$0.66 < f/f1 < 1.03 \tag{3}$$

(f: focal length of a total system, and f1: focal length of the first lens)

The conditional expression (3) defines a preferable conditional range to balance a performance change caused by a temperature change, and a aberration performance regarding the first lens comprising the glass lens. When the lower limit of the conditional expression (3) is exceeded, the performance change caused by the temperature change is big. On the contrary, when the upper limit of the conditional expression (3) is exceeded, the performance change caused by the temperature change becomes small but distortion or coma aberration is deteriorated.

It is further preferable that the following conditional expression (3a) is satisfied.

$$0.72 < f/f1 < 0.94 \tag{3a}$$

The conditional expression (3a) defines a further preferable conditional range in the conditional range defined by the above conditional expression (3) based on the above viewpoint.

It is preferable that the following conditional expression (4) is satisfied. In addition, it is further preferable that the second lens comprises the positive lens having the convex meniscus configuration on the image surface side and the following conditional expression (4) is satisfied.

$$3.2 < (R21+R22)/(R21-R22) < 5.5 \tag{4}$$

(R21: curvature radius of a second lens surface on the object side, and R22: curvature radius of a second lens surface on the image surface side)

The conditional expression (4) defines a preferable range to balance an exit pupil position and distortion mainly regarding the second lens. When the lower limit of the conditional expression (4) is exceeded, it is advantageous to the exit pupil position but the distortion is considerably deteriorated. On the contrary, when the upper limit of the conditional expression (4) is exceeded, it is advantageous to the distortion but it is disadvantageous to the exit pupil position, which is not preferable for the image-taking optical system for the solid-state image pickup element.

It is preferable that the following conditional expression (5) is satisfied.

$$v3 < 35 \tag{5}$$

(v3: Abbe number of the third lens)

The conditional expression (5) defines a preferable conditional range regarding chromatic aberration correction of the negative third lens. When the conditional range of the conditional expression (5) is exceeded, the chromatic aberration correction of the negative lens is not sufficient, so that chromatic aberration is deteriorated as a whole.

It is desirable that at least one surface of each lens is the aspheric surface like in each embodiment. When at least one aspheric surface is provided in each of the first to the third lenses, there is a great effect in correcting the spherical aberration, the coma aberration and distortion. In addition, it is preferable that the surface of the third lens is the aspheric surface on the image surface side, and negative power is gradually weakened from the lens center toward its periphery and positive power is provided in the peripheral part, which is effective in making the optical total length compact and arranging the exit pupil position far away.

Although the image-taking optical system according to each embodiment comprises only a refractive lens which deflects incident light by refraction (that is, light is deflected at an interface between media having different refractive indexes), the lens to be used is not limited to the above. For example, there may be used a diffractive lens which deflects the incident light by diffraction, a refractive and diffractive hybrid lens which deflects the incident light by combination of diffraction and refraction, a gradient index lens which deflects the incident light by refractive index profile in a medium. However, since a manufacturing method of the gradient index lens in which the refractive index is changed in the medium is complicated and its cost is high, a lens comprising a homogeneous material is preferably used as the first to the third lenses in the image-taking optical system according to the present invention.

According to need, a beam control plate to cut unnecessary light may be provided other than the aperture stop. In addition, a prism (a rectangular prism, for example), a mirror (a flat mirror, for example) and the like may be arranged to constitute an inflective optical system (an optical system which reflects the beam so as to bend an optical axis by 90° or about 90°, for example) by bending a light pass on its surface having no optical power (reflecting surface or diffracting surface, for example) in front, back or middle of the image-taking optical system. The bending position may be set according to need, and the digital device (digital camera and the like) on which the image-taking optical system is mounted seems to be thinned or made compact by appropriately bending the optical path.

The image-taking optical system according to each embodiment is suitable for being used as a small image-taking optical system for a digital camera or a digital device having an image inputting function (a camera phone, for example), and there can be provided the image-taking device which optically takes the image of the object and outputs the electrical signal by combining the above with an optical filter or an image-taking element. The image-taking device is a main component in a camera which takes a still image or a moving image of the object, and it comprises the image-taking optical system which forms the optical image of the object, an optical low-pass filter, an optical filter such as an infrared cut filter, and the solid-state image pickup element such as the CCD and the like which converts the optical image formed by the image-taking optical system to the electrical signal provided in this order from the object side, for example.

As examples of the camera, there are a digital camera, a video camera, a monitoring camera, an in-car camera, a television-phone camera, a door-phone camera, a personal computer, a mobile computer, a mobile phone, a PDA (Personal Digital Assistant), a peripheral device (a mouse, a scanner, a printer or the like) of the above, and a camera incorporated or externally provided in another digital device and the like. As can be clear from the above examples, the camera function can be added by mounting the image-taking device on the various kinds of devices. For example, there can be provided a digital device having an image inputting function such as the camera phone. In addition, a form according to need can be employed when the camera function is implemented. For example, the image-taking device unit may be detachably or turnably provided in a camera body, or the image-taking device unit may be detachably or turnably provided in a portable information device (a mobile phone, the PDA and the like).

As the solid-state image pickup element, the CCD comprising a plurality of pixels, a CMOS (Complementary Metal Oxide Semiconductor) sensor and the like are used, and the optical image formed by the image-taking optical system is converted to the electrical signal by the solid-state image pickup element. When the optical image to be formed by the image-taking optical system passes through the optical low-pass filter having predetermined frequency cutoff characteristics determined by a pixel pitch of the solid-state image pickup element, its special frequency characteristics is adjusted so as to minimize a so-called folding noise which is generated when the optical image is converted to the electrical signal. A predetermined image processing operation, image compression or the like is performed on the signal formed by the solid-state image pickup element according to need, and stored in a memory (a semiconductor memory, an optical disk or the like) as a digital video signal. The signal is transmitted through a cable, or it is converted to an infrared signal to be transmitted in some cases.

In addition, although the optical low-pass filter arranged between a final surface and the solid-state image pickup element of the image-taking optical system comprises the glass filter GF according to each embodiment, it may be any filter as long as it is appropriate to the digital input device to be used. For example, a birefringent low-pass filter formed of a material such as crystal in which a predetermined crystal axis direction is adjusted, a phase low-pass filter which attains necessary optical frequency cutoff characteristics by a diffraction effect and the like can be applied.

Hereinafter, the image-taking optical system according to the present invention will be described further in detail using contraction data. The following Examples 1 to 3 are examples of numeric values which correspond to the above embodiments 1 to 3, and lens constitution diagrams showing the embodiments 1 to 3 (FIGS. 4 to 6) show the lens constitutions of the corresponding Examples 1 to 3.

In the construction data in each Example, ri (i=1, 2, 3, . . . ) shows the i-th curvature radius (mm) from the object side, and di (i=1, 2, 3, . . . ) is the i-th axial distance (mm) from the object side, and Ni (i=1, 2, . . . ) and vi (i=1, 2, . . . ) show a refractive index (Nd) and Abbe number (vd) of the i-th optical component from the object side in a line d, respectively. In addition, reference character f designates a focal distance (mm) of the whole system, and reference character FNO designates an F number. Data corresponding to parameters defined by the conditional expressions are shown in a table 1.

The surface in which * is allotted to the curvature radius ri is the aspheric surface (a refractive optical surface having an aspheric surface configuration, a surface having a reflecting property which is equivalent to the aspheric surface and the like) and it is defined by the following equation (AS) showing a surface configuration of the aspheric surface. An aspheric surface data in each embodiment is shown together with other data (a coefficient having no notation is 0).

$$X(H)=(CO \cdot H^2)/\{1+\sqrt{(1-\epsilon \cdot CO^2 \cdot H^2)}\}+\Sigma(Aj \cdot Hj) \tag{AS}$$

In the equation (AS), "X(H)" is an amount of displacement (surface top reference) in a direction of the optical axis AX at a position of height H, "H" is a height perpendicular to the optical axis AX, "CO" is a paraxial curvature (=1/ri), "$\epsilon$" is a secondary curved surface parameter, and "Aj" is the j-th order aspheric surface coefficient.

Figure 7A:
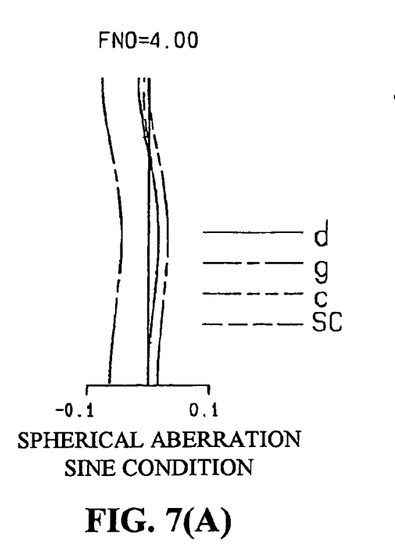
FIGS. 7(A) to 7(C) are aberration diagrams according to the Example 1.
Figure 7B:
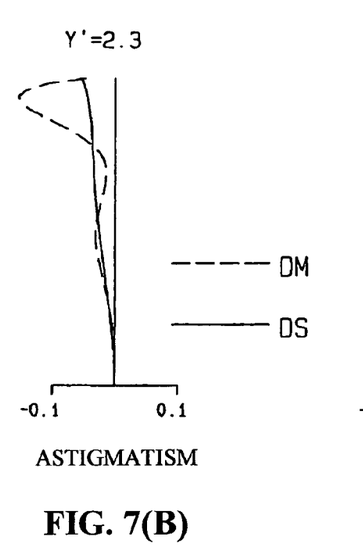
Figure 7C:
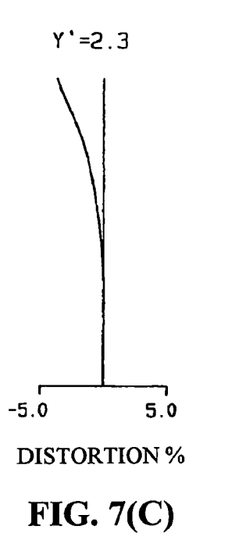
Figure 8A:
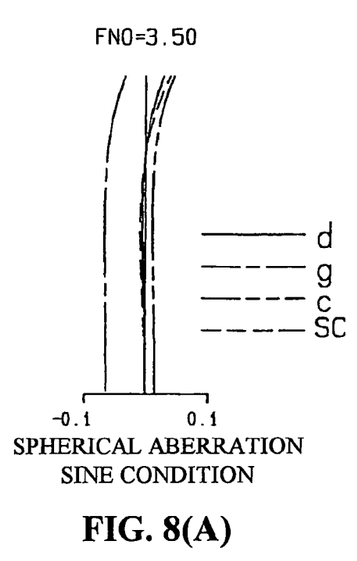
FIGS. 8(A) to 8(C) are aberration diagrams according to the Example 2.
Figure 8B:
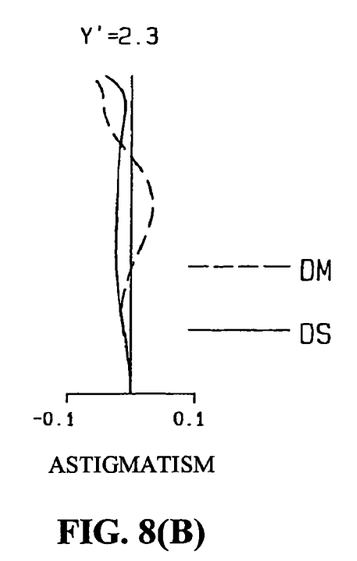
Figure 8C:
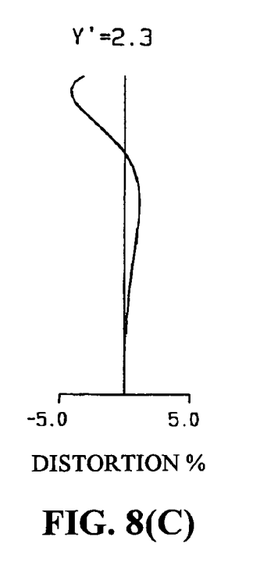
Figure 9A:
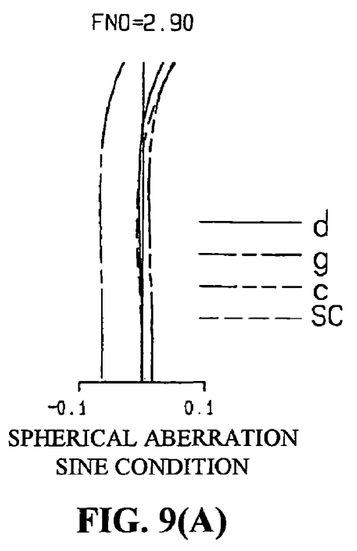
FIGS. 9(A) to 9(C) are aberration diagrams according to the Example 3.
Figure 9B:
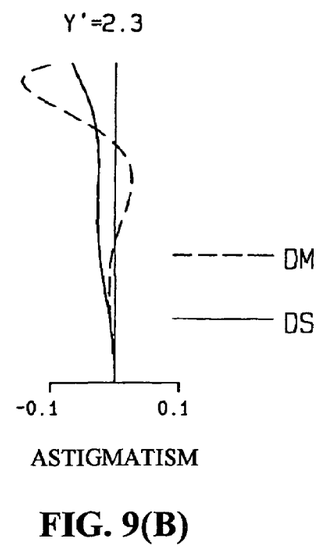
Figure 9C:
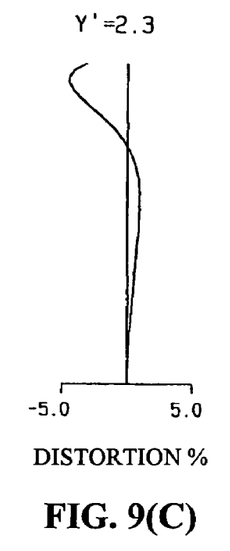

FIGS. 7 to 9 are aberration diagrams corresponding to the Examples 1 to 3, respectively in which FIGS. 7(A), 8(A) and 9(A) are spherical aberration diagrams, FIGS. 7(B), 8(B) and 9(B) are astigmatism aberration diagrams, and FIGS. 7(C), 8(C) and 9(C) are distortion aberration diagrams. "FNO" shows an F number and "Y" shows a maximum image height (mm). In the spherical aberration diagrams, a solid line d, a one-dotted line g and two-dotted line c show spherical aberration amounts (mm) in the d-line, the g-line, and the c-line, respectively, and a broken line SC designates a sine condition dissatisfaction amount (mm). In the astigmatism aberration diagrams, a broken line DM designates a meridional image surface (mm) and a solid line DS designates a sagittal image surface (mm). In addition, in the distortion aberration diagrams, a solid line designates distortion (%) of the d-line.

EXAMPLE 1 f=3.78, FNO=4.0

| Curvature Radius | Axial Distance | Refractive Index | Abbe Number |
|---|---|---|---|
| r1 = ∞(ST) | d1 = 0.100 | | |
| r2* = 1.910 | d2 = 1.029 | N1 = 1.58913 | ν1 = 61.18(L1) |
| r3* = 5.729 | d3 = 0.544 | | |
| r4* = −2.150(= R21) | d4 = 0.737 | N2 = 1.53048 | ν2 = 55.72(L2) |
| r5* = −1.348(= R22) | d5 = 0.137 | | |
| r6* = 2.366 | d6 = 0.659 | N3 = 1.58340 | ν3 = 30.23(L3) |
| r7* = 1.208 | d7 = 0.718 | | |
| r8 = ∞ | d8 = 0.500 | N4 = 1.51680 | ν4 = 64.20(GF) |
| r9 = ∞ | | | |

(Aspheric surface data of the 2nd surface (r2))
$\epsilon = -0.13173 \times 10^2$, $A4 = 0.21627$, $A6 = -0.15019$ (Aspheric surface data of the 3rd surface (r3))
$\epsilon = -0.99000 \times 10^2$, $A4 = 0.73389 \times 10^{-1}$, $A6 = -0.22629 \times 10^{-1}$ (Aspheric surface data of the 4th surface (r4))
$\epsilon = -0.23966 \times 10^2$, $A4 = -0.14831$, $A6 = 0.13999$, $A8 = -0.31646 \times 10^{-1}$, $A10 = 0.17064 \times 10^{-16}$ (Aspheric surface data of the 5th surface (r5))
$\epsilon = -0.54543$, $A4 = -0.14709 \times 10^{-1}$, $A6 = -0.34329 \times 10^{-1}$, $A8 = 0.44724 \times 10^{-1}$, $A10 = 0.47329 \times 10^{-17}$ (Aspheric surface data of the 6th surface (r6))
$\epsilon = -0.26473$, $A4 = -0.29856$, $A6 = 0.13888$, $A8 = -0.71177 \times 10^{-1}$, $A10 = 0.27646 \times 10^{-1}$, $A12 = -0.70608 \times 10^{-2}$ (Aspheric surface data of the 7th surface (r7))
$\epsilon = -0.35179 \times 10$, $A4 = -0.16530$, $A6 = 0.86818 \times 10^{-1}$, $A8 = -0.36284 \times 10^{-1}$, $A10 = 0.81618 \times 10^{-2}$, $A12 = -0.82444 \times 10^{-3}$

EXAMPLE 2 f=3.78, FNO=3.5

| Curvature Radius | Axial Distance | Refractive Index | Abbe Number |
|---|---|---|---|
| r1 = ∞(ST) | d1 = 0.100 | | |
| r2* = 1.861 | d2 = 0.756 | N1 = 1.58913 | ν1 = 61.18(L1) |
| r3* = 4.996 | d3 = 0.843 | | |
| r4* = −2.267(= R21) | d4 = 0.872 | N2 = 1.53048 | ν2 = 55.72(L2) |
| r5* = −1.406(= R22) | d5 = 0.100 | | |
| r6* = 2.176 | d6 = 0.659 | N3 = 1.58340 | ν3 = 30.23(L3) |
| r7* = 1.223 | d7 = 0.710 | | |
| r8 = ∞ | d8 = 0.500 | N4 = 1.51680 | ν4 = 64.20(GF) |
| r9 = ∞ | | | |

(Aspheric surface data of the 2nd surface (r2))
$\epsilon = -0.61809 \times 10$, $A4 = 0.13828$, $A6 = -0.60298 \times 10^{-1}$ (Aspheric surface data of the 3rd surface (r3))
$\epsilon = -0.50965 \times 10^2$, $A4 = 0.83548 \times 10^{-1}$, $A6 = -0.40279 \times 10^{-1}$ (Aspheric surface data of the 4th surface (r4))
$\epsilon = -0.29000 \times 10^2$, $A4 = -0.17981$, $A6 = 0.25919 \times 10^{-1}$, $A8 = 0.21186 \times 10^{-1}$, $A10 = 0.22351 \times 10^{-2}$ (Aspheric surface data of the 5th surface (r5))
$\epsilon = 0.24588$, $A4 = -0.41088 \times 10^{-1}$, $A6 = -0.56042 \times 10^{-1}$, $A8 = 0.1916 \times 10^{-1}$, $A10 = 0.15543 \times 10^{-1}$ (Aspheric surface data of the 6th surface (r6))
$\epsilon = 0.63811$, $A4 = -0.29728$, $A6 = 0.82532 \times 10^{-1}$, $A8 = -0.54854 \times 10^{-1}$, $A10 = 0.3384 \times 10^{-1}$, $A12 = -0.70604 \times 10^{-2}$ (Aspheric surface data of the 7th surface (r7))
$\epsilon = -0.25894 \times 10$, $A4 = -0.16366$, $A6 = 0.79649 \times 10^{-1}$, $A8 = -0.35364 \times 10^{-1}$, $A10 = 0.84556 \times 10^{-2}$, $A12 = -0.81487 \times 10^{-3}$

EXAMPLE 3 f=3.78, FNO=2.9

| Curvature Radius | Axial Distance | Refractive Index | Abbe Number |
|---|---|---|---|
| r1 = ∞(ST) | d1 = 0.100 | | |
| r2* = 1.985 | d2 = 0.795 | N1 = 1.58913 | ν1 = 61.18(L1) |
| r3* = 5.807 | d3 = 0.884 | | |
| r4* = −2.394(= R21) | d4 = 0.842 | N2 = 1.53048 | ν2 = 55.72(L2) |
| r5* = −1.434(= R22) | d5 = 0.100 | | |
| r6* = 2.185 | d6 = 0.659 | N3 = 1.58340 | ν3 = 30.23(L3) |
| r7* = 1.246 | d7 = 0.710 | | |
| r8 = ∞ | d8 = 0.500 | N4 = 1.51680 | ν4 = 64.20(GF) |
| r9 = ∞ | | | |

(Aspheric surface data of the 2nd surface (r2))
$\epsilon = -0.63779 \times 10$, $A4 = 0.11152$, $A6 = -0.41331 \times 10^{-1}$ (Aspheric surface data of the 3rd surface (r3))
$\epsilon = -0.68974 \times 10^2$, $A4 = 0.61252 \times 10^{-1}$, $A6 = -0.30625 \times 10^{-1}$ (Aspheric surface data of the 4th surface (r4))
$\epsilon = -0.29000 \times 10^2$, $A4 = -0.14411$, $A6 = -0.62567 \times 10^{-3}$, $A8 = 0.19639 \times 10^{-1}$, $A10 = 0.74753 \times 10^{-2}$ (Aspheric surface data of the 5th surface (r5))
$\epsilon = 0.21850 \times 10^{-1}$, $A4 = -0.27912 \times 10^{-1}$, $A6 = 0.51154 \times 10^{-1}$, $A8 = 0.13427 \times 10^{-1}$, $A10 = 0.12930 \times 10^{-1}$ (Aspheric surface data of the 6th surface (r6))
$\epsilon = 0.10308 \times 10$, $A4 = -0.26449$, $A6 = 0.75637 \times 10^{-1}$, $A8 = -0.54824 \times 10^{-1}$, $A10 = 0.33789 \times 10^{-1}$, $A12 = -0.71906 \times 10^{-2}$ (Aspheric surface data of the 7th surface (r7))
$\epsilon = -0.20991 \times 10$, $A4 = -0.16500$, $A6 = 0.79623 \times 10^{-1}$, $A8 = -0.34834 \times 10^1$, $A10 = 0.85138 \times 10^{-2}$, $A12 = -0.84757 \times 10^{-3}$

TABLE 1

| Conditional Expression | (1), (1a) f1/f2 | (2), (2a) f2/f3 | (3), (3a) f/f1 | (4) (R21 + R22)/ (R21 − R22) | (5) ν3 |
|---|---|---|---|---|---|
| Example 1 | 0.86 | −0.96 | 0.86 | 4.36 | 30.23 |
| Example 2 | 0.89 | −0.81 | 0.82 | 4.27 | 30.23 |
| Example 3 | 0.92 | −0.77 | 0.80 | 3.99 | 30.23 |

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An optical system, comprising the object side:
   an aperture stop;
   a positive first lens having a convex surface on an object side;
   a positive second lens having a convex surface on an image side; and a negative third lens having a concave surface on the image side, wherein the following conditional expressions are satisfied:

$$0.71 < f1/f2 < 1.1 \text{ and } -1.16 < f2/f3 < -0.64$$

where, f1: focal length of the first lens,
f2: focal length of the second lens,
f3: focal length of the third lens.

2. An optical system wherein the first lens is made from glass, and the other lenses are made from resin, comprising the object side:

an aperture stop;
a positive first lens having a convex surface on an object side;
a positive second lens having a convex surface on an image side; and
a negative third lens having a concave surface on the image side, wherein the following conditional expressions are satisfied:

$$0.66 < f/f1 < 1.03 \text{ and } 0.71 < f1/f2 < 1.1$$

where, f: focal length of a total system
f1: focal length of the first lens,
f2: focal length of the second lens.

3. An optical system wherein the second lens is a positive meniscus lens having a convex surface on the image surface side, comprising the object side:

an aperture stop;
a positive first lens having a convex surface on an object side;
a positive second lens having a convex surface on an image side; and
a negative third lens having a concave surface on the image side, wherein the following conditional expressions are satisfied;

$$0.71 < f1/f2 < 1.1 \text{ and } 3.2 < (R21+R22)/(R21-R22) < 5.5$$

where, f1: focal length of the first lens,
f2: focal length of the second lens,
R21: curvature radius of a second lens surface on the object side,
R22: curvature radius of a second lens surface on the image surface side.

4. An optical system comprising the object side:

an aperture stop;
a positive first lens having a convex surface on an object side;
a positive second lens having a convex surface on an image side; and
a negative third lens having a concave surface on the image side, wherein the following conditional expressions are satisfied:

$$0.71 < f1/f2 < 1.1 \text{ and } v3 < 35 \quad (5)$$

where f1: focal length of the first lens,
f2: focal length of the second lens
v3: Abbe number of the third lens.

5. An optical system, comprising the object side:
an aperture stop;
a positive first lens having a convex surface on an object side;
a positive second lens having a convex surface on an image side; and
a negative third lens having a concave surface on the image side, wherein the following conditional expression is satisfied:

$$-1.16 < f2/f3 < -0.64$$

where, f2: focal length of the second lens,
f3: focal length of the third lens.

6. An optical system according to claim 5, wherein the following conditional expression is satisfied:

$$0.71 < f1/f2 < 1.1$$

where, f1: focal length of the first lens.

7. An optical system according to claim 5, wherein the first lens is made from glass, and the other lenses are made from resin.

8. An optical system according to claim 7, wherein the following conditional expression is satisfied:

$$0.66 < f/f1 < 1.03$$

f: focal length of a total system.

9. An optical system according to claim 5, wherein the second lens is a positive meniscus lens having a convex surface on the image surface side.

10. An optical system according to claim 9, wherein the following conditional expression is satisfied:

$$3.2 < (R21+R22)/(R21-R22) < 5.5$$

where

R21: curvature radius of a second lens surface on the object side,
R22: curvature radius of a second lens surface on the image surface side.

11. An optical system according to claim 5, wherein the following conditional expression is satisfied:

$$v3 < 35 \quad (5)$$

where v3: Abbe number of the third lens.

12. A digital apparatus, comprising:

an image pickup device for converting an optical image into an electric signal;
an optical system for forming an optical image of an object on a light receiving surface of said image pickup device; and
a functioning portion for photographing a still image or a moving image of the object, wherein said optical system including from an object side:

an aperture stop;
a positive first lens having a convex surface on an object side;
a positive second lens having a convex surface on an image side; and
a negative third lens having a concave surface on the image side, and wherein the following conditional expression is satisfied:

$$0.71 < f1/f2 < 1.1 \text{ and } -1.16 < f2/f3 < -0.64$$

where f1: focal length of the first lens,
f2: focal length of the second lens,
f3: focal length of the third lens.

13. A digital apparatus, comprising:
an image pickup device for converting an optical image into an electric signal;
an optical system for forming an optical image of an object on a light receiving surface of said image pickup device; and
a functioning portion for photographing a still image or a moving image of the object,
wherein said optical system including from an object side:
an aperture stop;
a positive first lens having a convex surface on an object side;
a positive second lens having a convex surface on an image side; and
a negative third lens having a concave surface on the image side, and
wherein the following conditional expression is satisfied:

$$-1.16 < f2/f3 < -0.64$$

where,
f2: focal length of the second lens,
f3: focal length of the third lens.

* * * * *